Sept. 22, 1959      E. P. CARTER ET AL      2,905,869
APPARATUS AND METHOD FOR TESTING ELECTRIC BLASTING CAPS
Filed Feb. 5, 1954      4 Sheets-Sheet 1

INVENTOR
ELBERT P. CARTER
HENRY J. STINGER

BY *Carl A. Hechmer*

ATTORNEY

Sept. 22, 1959 E. P. CARTER ET AL 2,905,869
APPARATUS AND METHOD FOR TESTING ELECTRIC BLASTING CAPS
Filed Feb. 5, 1954 4 Sheets-Sheet 2
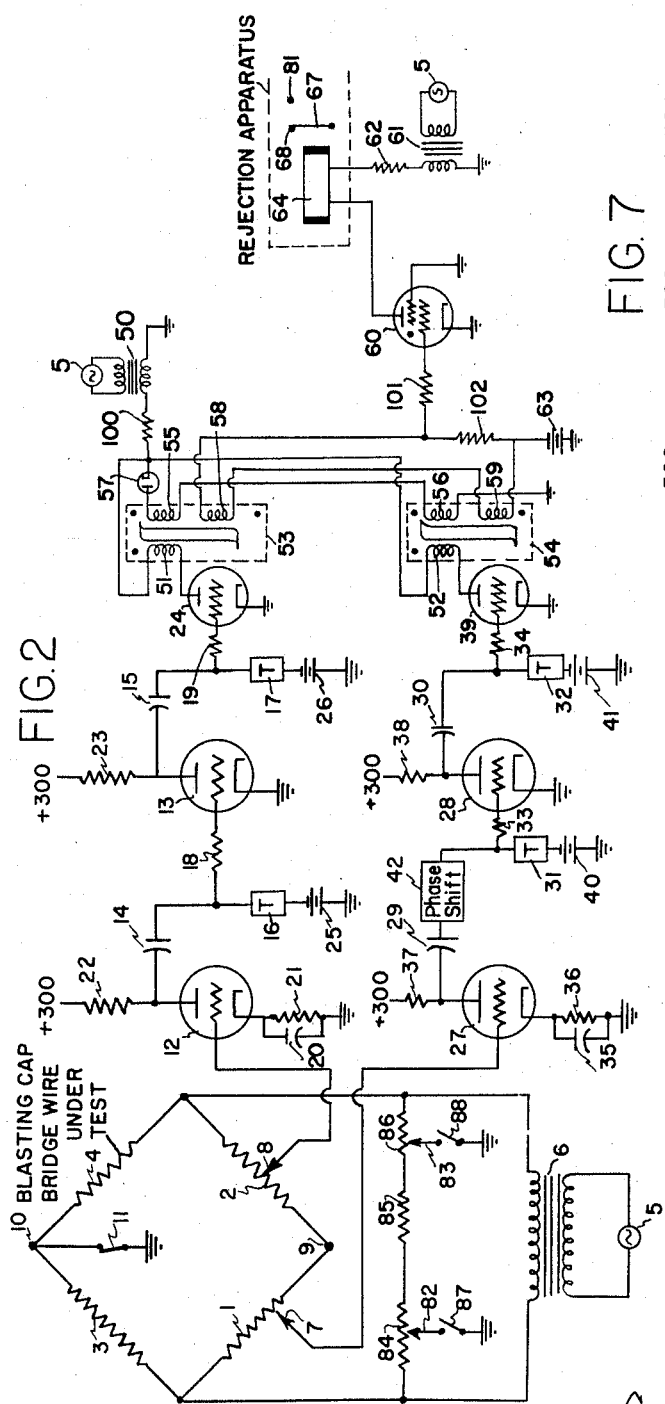
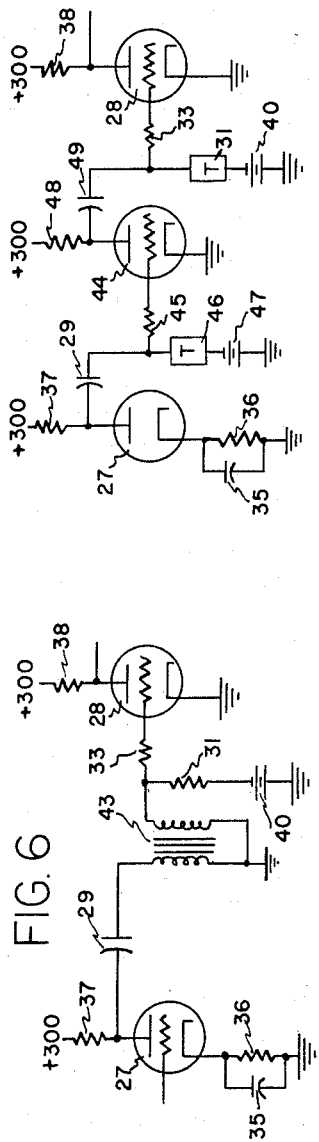
INVENTOR
ELBERT P. CARTER
HENRY J. STINGER
BY Carl A. Hechmer
ATTORNEY Sept. 22, 1959   E. P. CARTER ET AL   2,905,869
APPARATUS AND METHOD FOR TESTING ELECTRIC BLASTING CAPS
Filed Feb. 5, 1954   4 Sheets-Sheet 3

INVENTOR
ELBERT P. CARTER
HENRY J. STINGER
BY Carl A. Hechmer
ATTORNEY

United States Patent Office 2,905,869
Patented Sept. 22, 1959

2,905,869

APPARATUS AND METHOD FOR TESTING ELECTRIC BLASTING CAPS

Elbert P. Carter and Henry J. Stinger, Wilmington, Del., assignors to E. I. du Pont de Nemours and Company, Wilmington, Del., a corporation of Delaware Application February 5, 1954, Serial No. 408,335

5 Claims. (Cl. 317—149)

This invention relates to a test device for electrially fired blasting caps. More specifically, it relates to an apparatus for inspecting during assembly the suitability and intactness of the bridge wire of a mechanically assembled electrically fired blasting cap.

In the manufacture of electrically initiated blasting caps, the electrical characteristics of the bridge wire must be maintained within relatively close tolerances. The bridge wire of an electric blasting cap is the small diameter (0.002") high resistance wire spanning the bridge posts of the cap, to the latter of which are connected the lead wires. When the blasting machine is operated, a surge of firing current is passed through the bridge wire, heating it to white heat by virtue of its high inherent resistance, thereby igniting the combustible mix in the cap and effecting detonation. It is imperative that any fractures of bridge wires be detected during manufacture to safeguard against cap misfires, and it is particularly important that any momentary fractures which have occurred (i.e., those wherein the broken bridge wire ends fall back into more or less imperfect contact after breakage) be found, because such firing assemblies are very unreliable in service.

It is an object of the present invention to provide an apparatus wherein the intactness of the bridge wire of a mechanically assembled blasting cap can be continuously inspected during those periods of its assembly that the said bridge wire is under stress.

Another object is to provide apparatus for detecting whether the impedance of the bridge wire of an electrically initiated blasting cap is and remains within a close tolerance during mechanical assembly.

Another object is to provide a fast response apparatus which will detect a momentary fracture of a bridge wire of an electrically initiated blasting cap that is being mechanically assembled.

A further object is to provide an apparatus for the inspection of electrical properties of the bridge wire of an electrically initiated blasting cap which is self-testing between each cap observation.

These and other objects will become apparent in the course of the following specifications and claims.

An automatic assembling machine for electrically fired blasting caps has several operations which can critically affect the integrity of the bridge wire. One of the last of these operations, is the "crimping" of the metal casing containing the powder mixture on a resilient plug which acts as a support for the bridge posts of the cap to which the lead wires are connected. This operation places a stress on the bridge posts and bridge wire which connects them. At this instant, a momentary or a permanent fracture may occur. Such a momentary fracture may exist only for a period as short as a few milliseconds. The resulting cap, however, while it may show a complete electrical circuit, will possess indeterminate performance characteristics. The high degree of reliability required in the performance of a blasting cap is obvious. The failure of even a single cap may cause serious financial loss and an extremely dangerous hang-fire during the "shooting" of a dynamite charge. By the use of the present invention imperfect caps will not escape the attention of the manufacturer.

Since any device sensitive enough to detect momentary fractures as defined above is subject to failure in itself, it is highly desirable that the correct performance of the observing equipment be capable of being checked before each cap is subjected to test.

The invention will be more readily understood by reference to the drawings.

Figure 2 shows the circuit layout of the apparatus of Fig. 1.

Figures 6 and 7 are two separate types of a phase inverter for use in effecting a phase shift in one of the tolerance signal amplifier circuits, shown in Figure 2.

Figure 1:
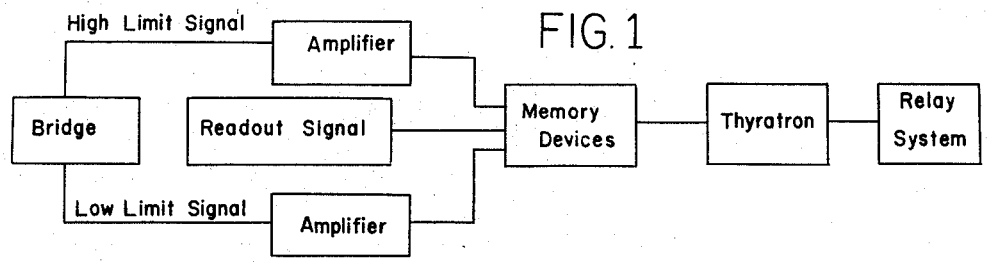
Figure 1 is a schematic representation of a preferred embodiment of circuit according to this invention.

In accordance with the present invention, a rejection apparatus having a fail safe relay circuit is provided which, when deactivated, causes the rejection of electrically fired caps having defective bridge wires from an automatic assembly mechanism, the said relay circuit being activated during the test of "within tolerance" caps by a thyratron control tube, the said tube being triggered by the combination of two preselected voltages which are induced by the application of an independent readout signal simultaneously to two magnetic core binary memory devices, each of the said binaries gating a different one of the said two fixed voltages induced by the said readout signal by virtue of the polarity of a separate tolerance limit signal, the said polarity of the said tolerance limit signal applied to one of the said binaries corresponding to the upper impedance tolerance limit of an acceptable intact bridge wire of an electrically fired cap while the said polarity of the other said tolerance limit signal, applied to the other of the said binaries corresponds to the lower impedance tolerance limit of an acceptable intact bridge wire of an electrically fired cap. The independent tolerance signals are developed in an A.C. Wheatstone bridge wherein the blasting cap bridge wire is introduced as an unknown arm, the ratio arms being tapped at two points on either side of theoretical null which tapped points correspond to balance when the blasting cap bridge wire is at its upper and lower tolerance limits respectively. Thus, for a "within tolerance" cap, a signal will appear at each of the tapped points. These signals are fed into separate magnetic core binary memory devices where their message, indicated by their polarity, is stored in the form of magnetic energy. An independent readout signal is then applied to the memory devices. It simultaneously induces a voltage at each binary provided the induced voltage has been previously gated by a tolerance limit signal of proper polarity. The voltages induced at the binaries by the readout signal are combined and applied to the grid of a thyratron. Their combination is sufficient to trigger the thyratron. The firing of the thyratron energizes a master relay which acts to retain the cap in the assembly fixture of the assembly mechanism. Should the observed cap be "outside tolerance,"

one of the tolerance limit signals is of such polarity as to fail to establish the proper flux in the core of the magnetic binary, thus failure to gate when the readout signal is applied to the memory device. The combination of voltages then fails to trigger the thyratron. The master relay is deactivated. The cap is rejected. By connecting the bridge wire of the blasting cap within the inspection circuit during that period in which it is subjected to greatest strain, momentary fractures of the bridge wire can be detected at the most likely station in the manufacturing process where such fractures have been found from experience to occur. The circuit provided herein is capable of very rapid response. The time response of the inspection circuit is thus so short that a fracture will cause a blasting cap to be rejected even though the bridge wire circuit is only opened for about 2 or 3 milliseconds. In the preferred embodiment, an operating condition-ascertaining auxiliary circuit is provided for determining, during the interval between the inspection of successive blasting caps, whether the apparatus is in perfect operating state prior to presentation of the next-following blasting cap for inspection.

Referring particularly to Figures 1 and 2, the impedance of the blasting cap bridge wire is made the unknown component of a modified Wheatstone bridge across which an alternating current is impressed. It will be understood that the bridge resistors are chosen so that only a low, non-damaging current and voltage is applied to the bridge wire in test, suitable values for 1.25 ohm nominal resistance bridge wire being about 25 milliamperes at 25 millivolts. For an acceptable "within tolerance" cap, two tolerance limit signals are generated. One indicates the cap to be within the high tolerance limit. The other indicates it to be within the low tolerance limit. Each of these signals is amplified and thereafter fed into a magnetic core binary memory device, such as a Type 5102A SMM, Alden Products Co., Brockton, Mass., the core of which exhibits a very nearly rectangular hysteresis loop. Under sufficient magnetizing force in either direction the core will be left with a residual flux which, depending on the polarity, can be considered characteristic of one of two states. The magnetic memory devices are thus bistable devices. Subsequent thereto, an independent readout signal is impressed on the magnetic core binary memory device. If properly gated by the tolerance limit signals, a voltage is generated which triggers a thyratron. The thyratron energizes a relay which permits the cap to be passed.

Referring particularly to Figure 2, a layout of the circuit controlling the master relay is shown. The resistive elements 1 and 2 form the ratio arms of a Wheatstone bridge across which an alternating voltage (e.g., 110 v., 60 c.) generated at 5 is impressed through transformer 6. The arm 4 of the bridge represents the blasting cap bridge wire. The resistance 3 is the standard arm of the bridge. A tap, 7 and 8 is made upon each of the ratio arms 1 and 2. The two taps are on either side of point 9 which, with point 10, is the theoretical null. Point 10 is grounded through relay contact 11. The taps are so adjusted that one will be at null when a cap at the high tolerance limit is inserted at 4 while the other will be at null when a cap at the low tolerance limit is so introduced. When a "within tolerance" cap is placed in the circuit, a signal appears at each tap. These signals are 180° out of phase. They are referred to herein as "tolerance limit signals." Each is amplified. The voltage of the tolerance limit signal originating at tap 8 is amplified in a two stage, fast response circuit consisting of triodes 12 and 13, capacitively coupled at 14 and 15. Each condenser is followed by a thyrite resistor 16 and 17, a non-linear element which in combination with grid limiting resistors 18 and 19 permits fast discharge of the condensers at high voltage, thus safeguarding against blocking the amplifiers. Typically, thyrite resistors 16 and 17, as well as 31, 32 and 46 hereinafter described, can be General Electric Co. Type 8399401G1, developing 1 megohm at 1 volt. Since the first triode 12 is never overdriven, its cathode is grounded for A.-C. signals through a bypass condenser 20. Cathode bias voltage is developed across resistor 21 by the flow of plate current through tube 12. The output voltage at each amplification stage is developed across load resistors 22 and 23. The output amplified voltage of these two stages is applied to the grid of triode 24 to control current flow in its plate circuit. The grids of 13 and 24 are biased negatively, with triode 24 biased to plate current cutoff, by direct current sources 25 and 26 respectively.

Amplification of the voltage of the tolerance limit signal originating at tap 7 occurs at triodes 27 and 28, capacitively coupled at 29 and 30. These capacitors are also followed by thyrite resistors 31 and 32, respectively, and grid limiting resistors 33 and 34, respectively. The cathode of triode 27 is grounded for A.-C. through bypass condenser 35 shunted across resistance 36. Output voltage is developed at each stage across load resistors 37 and 38. The output signal voltage is impressed upon the grid of triode 39 to control current flow in its plate circuit. Direct current sources 40 and 41 negatively bias the grids of triodes 28 and 39, respectively, tube 39 being biased to plate current cutoff.

It will be seen that the amplification of each tolerance limit signal is identical except that the signal appearing at tap 7 is shifted approximately 180° by a phase shift network. This is conveniently arranged after the first amplification stage as shown at 42 on Figure 2. The shift in phase is performed to make the two tolerance limit signal voltages possess the same polarity and approximately the same phase. Typical suitable circuits are shown in Figures 6 and 7. In Figure 6 an iron core transformer 43 having its primary and secondary winding tied is employed. In Figure 7 a third triode 44 is introduced in the circuit. It is protected against being overdriven by grid limiting resistor 45 and thyrite 46. Its grid is biased negatively by direct current source 47. Current is fed to its plate circuit through load resistance 48. It is capacitively coupled at 49.

The amplified voltage of each of the tolerance limit signals arising at taps 7 and 8 is fed to the grid of a triode, 24 and 39, respectively. The outputs of the two tolerance limit circuits at the grids of triodes 24 and 39 will, with the proper amount of amplification in the preceding amplifier stages, be sufficient to energize these triodes to saturate the cores of magnetic binary memory devices 53 and 54 for a minimum preselected deviation of a bridge wire from an acceptable impedance level. When the voltage of the respective tolerance limit signals applied to the grids is positive at the same time that the plate voltage of their corresponding triodes 24 and 39 is positive, unidirectional current flows. Power is supplied to the plate of each of triodes 24 and 39 through transformer 50 from generator source 5, preferably the same source that feeds the modified Wheatstone bridge. This unidirectional current flow passes through primary windings 51 and 52 of binaries 53 and 54. These binaries have magnetic characteristics so designed that a unidirectional current pulse through the primary will cause the magnetic circuit of the core of the binary to be saturated in one direction. Only that pulse of current in a winding which reverses the direction of the core magnetic flux will be reflected in secondary windings 58 and 59 as an induced voltage. A series of current pulses in any windings in the same flux generating direction, without intermediate current pulses of opposite direction will not induce voltages in other windings because such recurring current pulses do not change the direction of the core magnetic flux. This is due to the very steep flux-magnetizing force characteristic or nearly rectangular hysteresis loop of the core. Thus when a unidirectional current pulse flows through each of windings 51 and 52, as happens when the voltage signals applied to triodes 24 and 39 are of the same positive polarity indicating the cap bridge wire to be within tolerance limits, the cores of the binaries in each of binary devices 53 and 54 are saturated in the same direction. Thereafter, a readout signal consisting of a current pulse having a direction opposite to that which previously flowed in windings 51 and 52 is applied at windings 55 and 56, these windings being part of binary devices 53 and 54 respectively. This readout signal is the output of a half wave rectifier 57 which is fed with an alternating current from generator 5 through transformer 50 and line resistor 100. Since the readout signal, at windings 55 and 56, is of a polarity opposite to that which had previously appeared at windings 51 and 52 (assuming the cap bridge wire to be "within tolerance"), the magnetic flux of the cores in each of the binaries is reversed and a voltage is induced in each of windings 58 and 59. The induced voltages combine and the algebraic sum is impressed upon the grid of thyratron 60, through line resistors 101 and 102. The grid is negatively biased by direct current source 63. The thyratron is of such characteristics that an induced voltage of the same polarity and magnitude at each of windings 58 and 59 is required to trigger it. Upon being triggered, thyratron 60 fires. The current source for its plate circuit is obtained through transformer 61 from generator 5. Load resistor 62 and master relay 64 are in the plate circuit of thyratron 60. Master relay 64 is energized by current flow in this circuit.

From a consideration of the above it will be readily seen that the current flow at 51 and 52 establishes a magnetic flux direction in the respective cores which, when subsequently reversed by current flow through windings 55 and 56, results in the production of triggering voltages which are induced at 58 and 59. The triggering of thyratron 60 is preselected as to require induced voltages at both binaries. Thus, if current fails to flow at either 51 or 52, the direction of residual magnetic flux in that core will not be changed from the direction in which it was placed by the preceding readout signal current pulse through 55 and 56. The subsequent readout signal current pulse in 55 and 56 will then fail to induce a voltage in the one of windings 58 or 59 whose core flux it does not alter. Therefore, the triggering of thyratron 60 requires alternately current flow through 51 and 55 and also alternately through 52 and 56. A cap, the bridge wire of which, has an impedance above the set tolerance limit will cause a failure of such current flow at one of the windings 51 and 52. Similarly, a below limit cap causes failure of current flow at the other of these windings. A within tolerance cap produces current pulses at each of 51 and 52. The subsequent readout signal pulse of opposite polarity through 55 and 56 induces voltage at each of 58 and 59, the combined value of which is sufficient to trigger thyratron 60. The firing of thyratron 60 signals the rejection apparatus that the cap is "within tolerance" and it is passed. If at any instant during observation the cap falls outside the preset tolerance, for instnace, as by a momentary fracture, the thyratron will fail to fire and the rejection apparatus will reject the cap as defective. Since thyratron 60 is powered through transformer 61 from common alternating power source 5, it is cut off during the negative part of each cycle.

When generator 5 is a 60 cycle supply, the bridge wire of the cap under observation will be examined sixty times per second. A power source of higher frequency will increase the number of observations during any given time interval. It is convenient to use a common alternating current supply to the plates of 24 and 39 and to half wave rectifier 57, since current flow of opposite polarity will then alternately flow in 51 and 55 and also alternately flow in 52 and 56 provided the tolerance limit signals indicate a "within tolerance" cap. However, it is not necessary that the power source of these pairs of windings be common or alternating provided the readout signal is timed to flow after an indication by the tolerance limit signals. Furthermore, it is not necessary that the current flow in windings 51 and 52 occur simultaneously provided again, that the effect of each tolerance limit signal is registered in the binary core prior to each readout pulse. Finally, it is not necessary that the current flow at windings 51 and 52 be in phase since they may be entirely different frequency. It is essential only that the effect of each of the tolerance limit signals be registered on its binary core over any preset period between readout signals.

It will be understood that, if the amplification of the tolerance limit signal voltages in tubes 12 and 13 for tap 8 and 27 and 28 for tap 7 is sufficient, that triodes 24 and 39, respectively, can be dispensed with and the amplifier output supplied directly to windings 51 and 52. However, it is preferred to utilize triodes 24 and 39, because proper phase relationship is thereby automatically maintained between the amplifier output and the readout signal and, of course, in addition these triodes provide additional signal voltage amplification. In operation, the signal voltages emanating from the Wheatstone bridge and applied to the windings of the binaries must be maintained in out-of-phase relationship with respect to the readout signal for a within tolerance conductive device under test and in phase relationship with respect to the readout signal for a conductive device lying outside the tolerance limits. Also, the A.-C. power source supplying the plate of thyratron 60 must have a voltage phase which is the same as that of the readout signal current, and of the same polarity.

Figure 3:
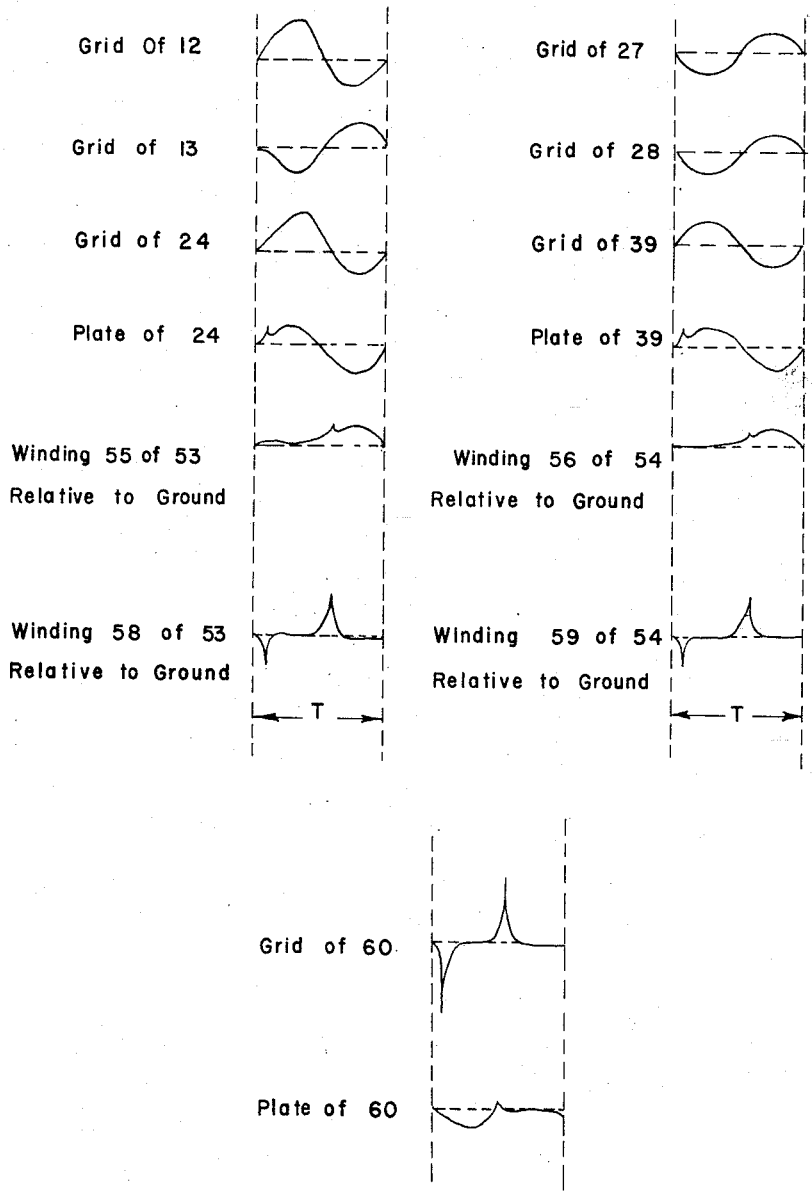
Figure 3 illustrates the voltage wave forms at various points in the circuit of Fig. 2 existing during the testing of an acceptable blasting cap.

Figure 3 illustrates the voltage wave forms at various stages of the circuit. The signal voltages generated at taps 7 and 8 and fed into the grids of 27 and 12, respectively, are opposite in polarity for a "within tolerance" cap. The voltage from the plate circuit of 27 is shifted 180° at 42. Thus, the grid signal voltages of 13 and 28 are of similar polarity. These signals are inverted at the grids of each of 24 and 39. The waveform of the plate voltage of each of these tubes is in phase with that of the grid voltage and each is essentially sinusoidal, there being a slight, abrupt peak on the rising side of the positive half of the wave. This peak is the result of current flow in the plate circuit. The waveform of the voltage of the readout signal impressed across windings 55 and 56 of binaries 53 and 54 shows a pulsating voltage having a slight, abrupt peak due to current flow on its rising side. The voltages induced in each of windings 58 and 59 due to abrupt current flow in 55 and 56 appear as sharp peaks occurring in each half-cycle. These two signals are combined at the grid 60. An uneven pulsating current is thereby triggered in the plate of 60. This plate current keeps the master relay energized.

As a specific example of the operation of the circuit, assume the blasting cap bridge wire inserted as resistance 4 to have a nominal value of 10 ohms. Tap 8 is adjusted to permit a deviation of no more than 20% above 10 ohms. Tap 7 is set to provide a deviation of no more than 10% below 10 ohms. Under these conditions a blasting cap bridge wire within the limits of 12 to 9 ohms can be made to produce a 20-volt pulse at the grid of thyratron 60, 10 volts having been generated at each of windings 58 and 59. The thyratron is preselected to require at least a 15-volt pulse as triggering pulse. When the blasting cap bridge wire is either above or below the tolerance limits, then the readout signal across binaries 53 and 54 induces a voltage into only one of windings 58 and 59. The 10 volts so generated are not sufficient to trigger the thyratron. The master relay 64 of the rejection apparatus will open. The cap will be rejected. It will be obvious from a consideration of the above that the circuit permits use of thyratrons of widely different individual characteristics and is not affected by varying thyratron tube characteristics during operation.

Figure 4:
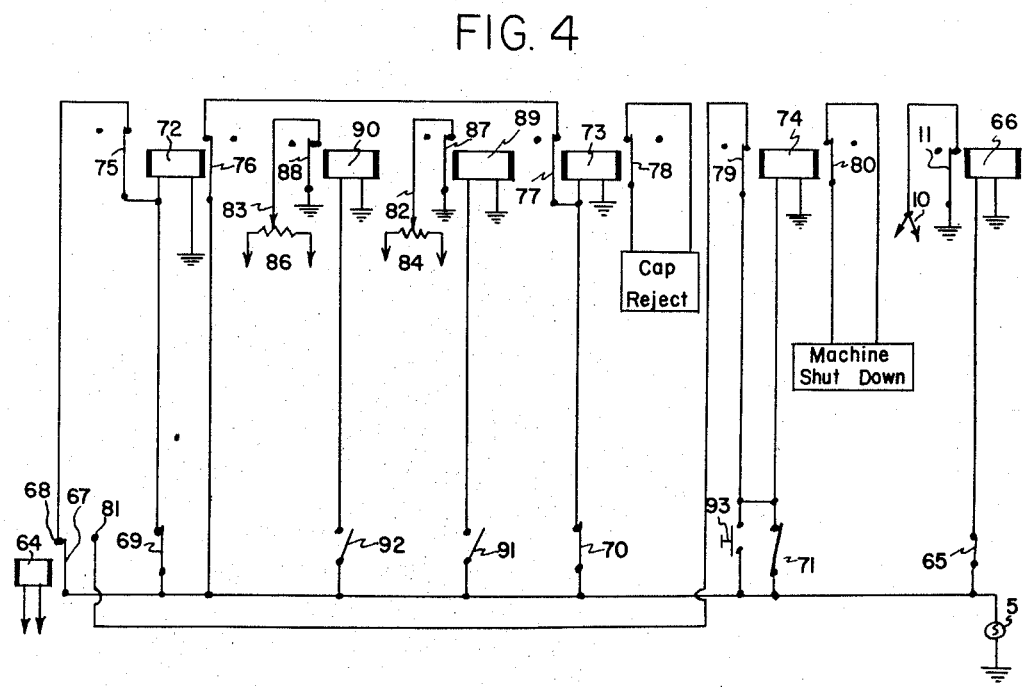
Figure 4 is a partially schematic circuit diagram of the relay system of a preferred design of rejection apparatus associated with this invention.

The relay circuit of the rejection apparatus, which provides a fail safe condition and permits testing of the tolerance limit signal circuit while no blasting cap bridge wire is under inspection is illustrated in Figure 4. Power for operation of the relay circuit is derived from common power source 5. The various switches and contactors are shown in the position in which they are found when a "within tolerance" blasting cap bridge wire is inserted as impedance 4. Cam actuated switch 65 is closed, energizing solenoid 66 which thereby closes contact 11. The closing of contact 11, as will be evident from Figure 2, completes the circuits for generation of each of the tolerance limit signals at the Wheatstone bridge. The master relay 64 is energized by thyratron 60 closing contactor 67 across contact 68. Cam actuated switches 69, 70 and 71 are also closed, thereby energizing solenoids 72, 73 and 74, respectively. Energization of each solenoid operates two contactors. Solenoid 72 closes contactors 75 and 76 on their contacts adjacent solenoid 72. Solenoid 73 closes contactors 77 and 78 on their contacts adjacent solenoid 73. Solenoid 74 closes contactors 79 and 80 on their contacts adjacent solenoid 74. At this point cam operated switches 69 and 70 are opened by rotation of the master cam of the rejection apparatus tolling out its cycle. Since master relay 64 is energized, solenoid 72 remains energized through contactor 67 closed on contact 68 and through contactor 75. Furthermore, solenoid 73 remains energized through contactors 76 and 77 remaining closed. If master relay 64 is not energized during the period at which switches 69 and 70 are open, solenoids 72 and 73 will be de-energized, thereby opening contactors 75, 76, 77 and 78. The opening of contactor 78 actuates a reject mechanism and the cap being inspected is removed from the assembly line.

After the tested cap is either passed or rejected, and before the next blasting cap bridge wire is inserted to be inspected, the inspection apparatus itself is tested for proper operation. During this period master relay 64 is not energized, provided no stray signals of a spurious nature are being developed. Contactor 67 accordingly closes across contact 81, with cam actuated switches 69 and 70 at this time closed. Cam actuated switches 71 and 65 are open under the progression of the master cam. It will be obvious that energization of master relay 64 under these conditions will cause contactor 67 to open at contact 81 thereby de-energizing solenoid 74. The de-energization of 74 opens contactor 80 which stops the entire assembly mechanism.

In the preferred embodiment of apparatus according to this invention auxiliary means are provided for checking the operation of the equipment. Thus, in the time interval between successive cap tests an artificial low limit signal and an artificial high limit signal is impressed upon the circuit at different times. In the absence of stray voltages, these artificial signals will fail to trigger the thyratron and master relay 64 will remain de-energized. With reference to Figure 2, the artificial signals are generated across checking taps 82 and 83. Checking taps 82 and 83 are adjusted on the circuit arm composed of resistances 84, 85 and 86 so as to provide an artificial high limit signal when one of the checking taps is connected to ground and an artificial low limit signal when the other checking tap is connected to ground. Checking taps 82 and 83 are connected to ground by means of solenoid actuated contactors 87 and 88, respectively. Contactor 87 is actuated by solenoid 89. Contactor 88 is actuated by solenoid 90. Solenoids 89 and 90 are energized by cam actuated switches 91 and 92, respectively. During the check switches 91 and 92 are alternately closed and opened by the progression of the master cam, cam actuated switches 65 and 71 being open at this time. A false signal will, by operation of thyratron 60 and consequent energization of master relay 64, de-energize solenoid 74, thereby opening contactor 80 which shuts down the entire assembly mechanism. After assembly machine shut down, it is necessary to depress reset switch 93 manually to again energize solenoid 74.

Figure 5:
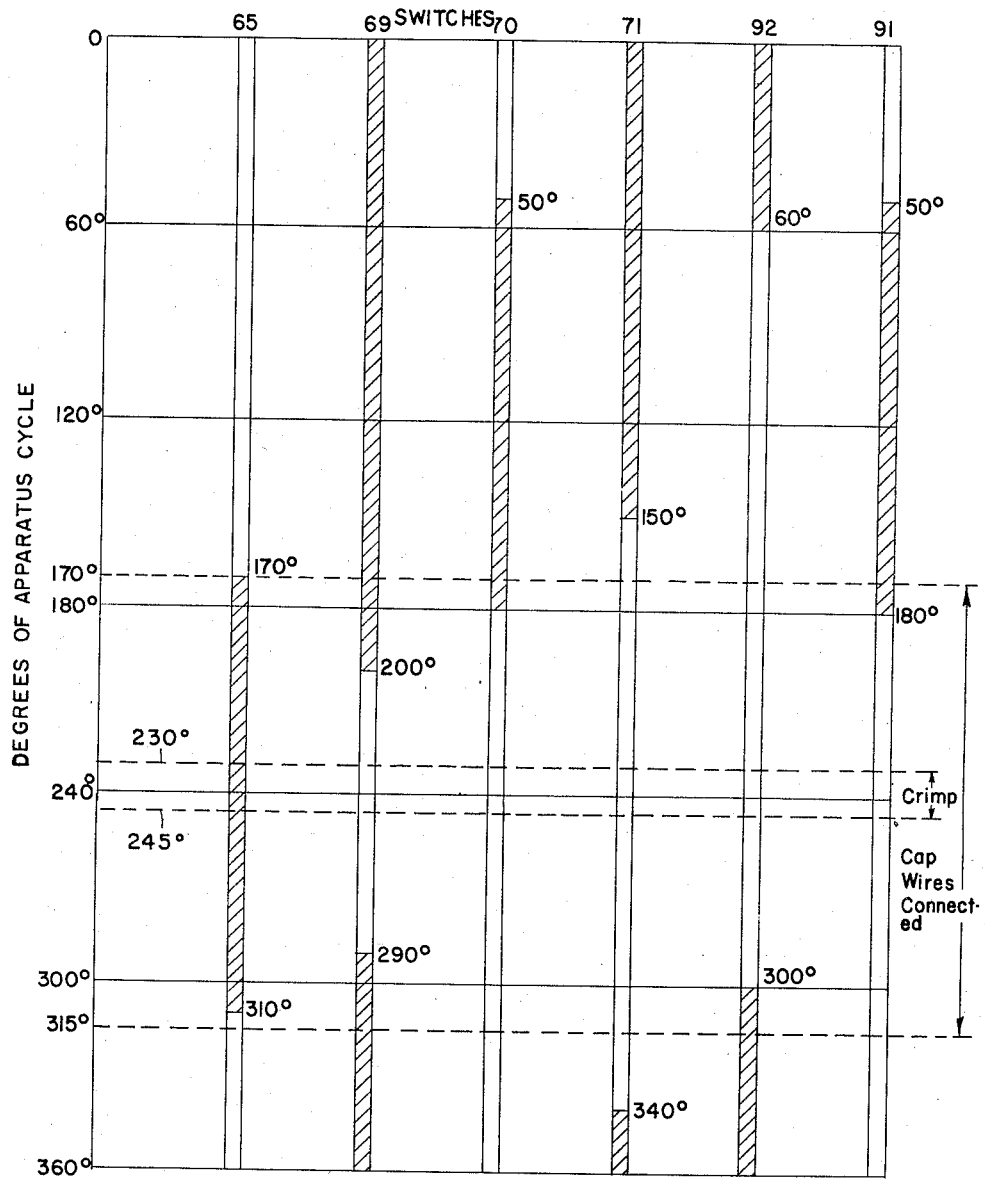
Figure 5 is a timing chart showing the time relationship of the various inspection and test functions of the apparatus of this invention during a complete cycle of an automatic mechanism for assembly of an electrically fired blasting cap.

Figure 5 is a timing chart showing the sequence of closing of the various cam actuated switches. The leads of the blasting cap bridge wire are connected in the bridge circuit by conventional means not further described herein at the 170° point in the inspection cycle and disconnected at 315°. The period of tolerance limit signal generation for a "within tolerance" cap corresponds to the period during which switch 65 is closed, i.e., from 170° to 310°. From 200° to 290°, switch 69 opens checking whether such signals have been generated. The crimping of the cap body to the resilient plug supporting the bridge posts with spanning bridge wire of the cap occurs in the middle of the inspection period, i.e., from 230° to 245°. The cap reject mechanism is held in the "pass" position from 50° to 180° by closure of cam actuated switch 70. This is necessary to reset the reject mechanism, such as after a rejection, thereafter providing energization for solenoid 73 through contactors 76 and 77, solely. The machine shut down mechanism is sensitized from 340° to 150° by the opening of switch 71. Any false signal in this interval will energize master relay 64 and open contactor 67 from its contact 81. Solenoid 74 is thereby de-energized causing assembly machine shutdown by opening of contactor 80. The low limit test signal is applied by closing switch 92 from 300° to 60°. The high limit test signal is applied by closing switch 91 from 50° to 180°.

A particularly advantageous property of the circuit is that it can only fail safe. Thus, should a defect arise affecting the polarity of either the high or the low limit signals, caps fed into the machine would be continuously rejected. A defect which would result from a stray signal would cause a shut-down of the entire assembly mechanism.

While the equipment has been described in detail particularly with reference to examining the bridge wire of a mechanically assembled blasting cap, it is obvious that it will be useful in many other applications where an inspection of impedance characteristics may be used to control manufacturing procedures within prescribed limits. As an example of such use may be mentioned the regulation of voltage between several limits in a voltage regulated power supply.

Many other modifications will be apparent to those skilled in the art without a departure from the inventive concept by virtue of the disclosure made herein.

We claim:
1. An apparatus for testing the impedance of an electrically conductive device comprising in combination an A.-C. Wheatstone bridge wherein said electrically conductive device is the unknown arm and a tap is provided on either side of null of said bridge, the position of one said tap being preselected to constitute the point of nullity of said bridge when said electrically conductive device is at an upper predetermined tolerance limit and the position of the other said tap being preselected to constitute the point of nullity of said bridge when said electrically conductive device is at a lower predetermined tolerance limit, individual amplifiers in circuit with each said tap, individual magnetic core binaries each having three coil windings in electrical circuit at a first winding with the output of individual ones of each said amplifiers, a pulse source of common readout signal current in electrical circuit with a second winding of both said binaries, said individual amplifiers effecting a phase shift such that said output of each amplifier is out-of-phase with respect to said readout signal current for a within tolerance conductive device under test and in phase with respect to said readout signal current for a conductive device under test lying outside said tolerance limits, a thyratron tube with grid in electrical circuit with the third windings of both said binaries, said third windings being connected in series-aiding relationship one to the other, and a control device comprising a master control relay in electrical circuit with the plate of said thyratron tube and having an A.-C. power source supplying the plate circuit of said thyratron tube at a voltage phase which is the same as that of said pulse source of common readout signal current and of the same polarity.

2. An apparatus according to claim 1 wherein said electrically conductive device is an electrically fired blasting cap bridge wire.

3. An apparatus for testing the impedance of an electrically conductive device according to claim 1 provided with auxiliary means for interposing sequentially and in substitution for said electrically conductive device as the unknown arm of said Wheatstone bridge electrical impedances above and below said upper and lower predetermined tolerance limits as a check of the operation of said apparatus, and means for restoring said apparatus to condition for testing the impedance of an electrically conductive device to operating condition for again testing the impedance of an electrically conductive device after the completion of each successful said check of operation.

4. An apparatus according to claim 1 provided with individual triode tubes each having its grid in electrical circuit with the output side of one of said individual amplifiers and its plate in electrical circuit with said first winding of said individual magnetic core binaries, so that said plate is in voltage phase with said common readout signal current.

5. An apparatus for testing the impedance of an electrically conductive device comprising in combination an A.-C. Wheatstone bridge wherein said electrically conductive device is the unknown arm and a tap is provided on either side of null of said bridge, the position of one said tap being preselected to constitute the point of nullity of said bridge when said electrically conductive device is at an upper predetermined tolerance limit and the position of the other said tap being preselected to constitute the point of nullity of said bridge when said electrically conductive device is at a lower predetermined tolerance limit, individual amplifiers in circuit with each said tap, individual triode tubes each having grid elements in electrical circuit with the output of individual ones of said amplifiers, individual magnetic core binaries each having three coil windings in electrical circuit at a first winding with a plate element of one of said triode tubes, a pulse source of common readout current in electrical circuit with the opposite ends of said first windings from the ends of said first windings in circuit with the plate elements of said triode tubes and in series sequence with (1) the positive terminal of a half wave rectifier element and (2) a second winding of both said binaries, a thyratron tube with grid in electrical circuit with the third windings of both said binaries, said third windings being connected in series-aiding relationship one to the other, and a control device comprising a master control relay in electrical circuit with the plate of said thyratron tube and having an A.-C. power source supplying the plate circuit of said thyratron tube at a voltage phase which is the same as that of said pulse source of common readout signal current and of the same polarity.

References Cited in the file of this patent

UNITED STATES PATENTS

| | | |
|---|---|---|
| 2,468,625 | Goetz | Apr. 26, 1947 |
| 2,451,613 | Darby et al. | Oct. 19, 1948 |
| 2,468,843 | Sunstein | May 3, 1949 |
| 2,505,072 | Sunstein | Apr. 25, 1950 |
| 2,507,566 | Frisbie et al. | May 16, 1950 |

UNITED STATES PATENT OFFICE

CERTIFICATE OF CORRECTION

Patent No. 2,905,869                                    September 22, 1959

Elbert P. Carter et al

It is hereby certified that error appears in the printed specification of the above numbered patent requiring correction and that the said Letters Patent should read as corrected below.

Column 3, line 3, for "failure" read -- failing --; line 18, after "auxiliary" strike out "cir-".

Signed and sealed this 22nd day of March 1960.

(SEAL)
Attest:

KARL H. AXLINE
Attesting Officer

ROBERT C. WATSON
Commissioner of Patents